(12) United States Patent
Ballinger et al.

(10) Patent No.: US 6,477,831 B1
(45) Date of Patent: Nov. 12, 2002

(54) COMBATTING AIR POLLUTION

(75) Inventors: Todd Howard Ballinger, Audubon; Christopher John Bennett, Exton; Barry John Cooper, Radnor; David Scott Lafyatis, Malvern, all of PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/350,483

(22) Filed: Jul. 9, 1999

(30) Foreign Application Priority Data

Jul. 24, 1998 (GB) .............................................. 9816134

(51) Int. Cl.[7] .................................................. F01N 3/00
(52) U.S. Cl. ........................... 60/284; 60/274; 60/289; 60/297; 60/301
(58) Field of Search ........................ 60/284, 289, 300, 60/297, 301, 299, 303, 274

(56) References Cited

U.S. PATENT DOCUMENTS

| | | | |
|---|---|---|---|
| 4,976,292 A | | 12/1990 | Cornelison et al. |
| 5,319,929 A | | 6/1994 | Cornelison et al. |
| 5,390,488 A | | 2/1995 | Ament et al. |
| 5,411,711 A | | 5/1995 | Swars |
| 5,417,062 A | | 5/1995 | Swars et al. |
| 5,456,063 A | * | 10/1995 | Yoshizaki et al. ............ 60/284 |
| 5,456,890 A | | 10/1995 | Tasi et al. |
| 5,538,697 A | * | 7/1996 | Abe et al. .................... 422/171 |
| 5,551,231 A | * | 9/1996 | Tanaka et al. ................. 60/289 |
| 5,634,331 A | * | 6/1997 | Aoki et al. .................... 60/284 |
| 5,784,878 A | * | 7/1998 | Kato et al. .................... 60/274 |
| 5,802,845 A | * | 9/1998 | Abe et al. ..................... 60/274 |
| 5,818,119 A | * | 10/1998 | Fukuchi et al. ............... 60/300 |
| 6,029,441 A | * | 2/2000 | Mizuno et al. ................ 60/274 |

FOREIGN PATENT DOCUMENTS

| | | |
|---|---|---|
| EP | 0 747 581 | 5/1996 |
| EP | 0727567 | 8/1996 |
| GB | 2277045 | 10/1994 |
| JP | 5-59937 | 3/1993 |
| JP | 5059937 | 3/1993 |
| WO | WO 95/08702 | 3/1995 |
| WO | WO 96/39576 | 6/1996 |

* cited by examiner

Primary Examiner—Thomas Denion
Assistant Examiner—Binh Tran
(74) Attorney, Agent, or Firm—RatnerPrestia

(57) ABSTRACT

Engine exhaust gas emissions are cleaned up using apparatus comprising an electrical heater, a first catalyst for oxidizing CO and $H_2$, and a hydrocarbon oxidation catalyst (which may be the same as the first catalyst). Engine management initiates electrical heating upon start-up of the engine, and ensures that there is sufficient CO and $H_2$ and sufficient additional air supplied to the exhaust system, to provide chemical energy in the form of exotherm, whereby the hydrocarbon oxidation catalyst is speeded in reaching light-off temperature.

29 Claims, 1 Drawing Sheet

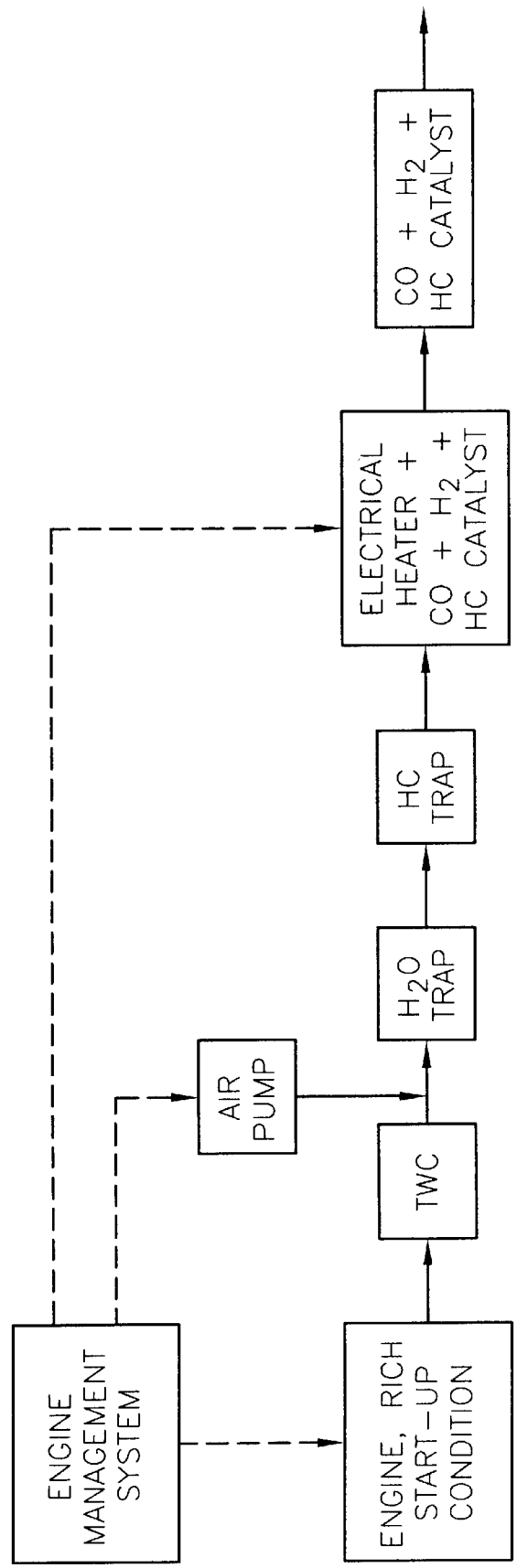

COMBATTING AIR POLLUTION

BACKGROUND OF THE INVENTION

This invention relates to an engine incorporating means to combat air pollution from its exhaust gas and to a method of converting pollutants in the exhaust gas of an engine in order to combat air pollution. The engine may be a stationary engine but is especially a vehicle engine. The engine may be powered by petrol (gasoline), diesel, natural gas or other hydrocarbon or oxygenate fuel. The invention will be described with particular reference to petrol fuelled engines, but is not to be considered to be limited thereto.

The main pollutants in the exhaust gas of an engine such as a petrol engine are carbon monoxide (CO), hydrocarbons and nitrogen oxides. The amount of these pollutants which is emitted in the exhaust gas into the air is generally reduced by means of catalysts in the exhaust apparatus of the engine. CO is converted to $CO_2$ by a CO oxidation catalyst. Hydrocarbon is converted to $CO_2$ and water by a hydrocarbon oxidation catalyst. Nitrogen oxides are converted to nitrogen by a nitrogen oxides reduction catalyst. A so-called three-way catalyst converts CO, hydrocarbon and nitrogen oxides in this way. Three-way catalysts are composed of a mixture of catalytically active materials, at least one being active for the conversion of CO and hydrocarbons and at least one for the conversion of nitrogen oxides. Three-way catalysts are generally based on rhodium admixed with platinum and/or palladium.

As regulations governing the amount of pollutants which may be emitted from engines such as petrol engines have become stricter, attention has been focussed on the start-up phase from ambient temperature. For present purposes, ambient temperature may be defined as 25° C. Emissions of hydrocarbons are highest in this phase because the hydrocarbon oxidation catalyst has not warmed up to its operating temperature. The "light-off" temperature is the temperature at which 50% of the pollutant is converted. On starting an engine at ambient temperature, the time taken for the hydrocarbon oxidation catalyst to warm up to its light-off temperature is significant, and in that time a significant amount of hydrocarbon is emitted into the air. Various approaches have been proposed for reducing this cold-start emission of hydrocarbon, including:

(a) trapping hydrocarbon at low temperatures and releasing it at high temperatures;
(b) electrically heating the catalyst;
(c) close-coupling the catalyst, whereby the catalyst is positioned very close to the engine in order to benefit well from engine heat; and
(d) employing a CO oxidation catalyst which lights off below ambient temperature in combination with an engine and exhaust apparatus adapted so that the exhaust gas contacting the catalyst contains sufficient oxygen and sufficient CO and/or hydrogen that the exothermic reaction of the oxygen with the CO and/or hydrogen generates enough heat to raise the catalyst to at least the light-off temperature of the hydrocarbon oxidation catalyst so that the hydrocarbon oxidation catalyst is at a temperature of at least its light-off temperature.

Emission regulations, however, are becoming ever stricter. In the United States, the hydrocarbon limit is tightening from the 0.04 g per mile (1.6 km) (as measured over the Federal Test Procedure cycle) ULEV limit to the newly proposed SULEV limit of 0.008 g per mile (1.6 km) and EZEV limit of 0.004 g per mile (1.6 km). The present invention has for an object the achievement of very stringent hydrocarbon emission standards.

SUMMARY OF THE INVENTION

The invention provides an engine producing exhaust gas containing CO, $H_2$ and hydrocarbon, the engine having:
(a) exhaust apparatus through which the exhaust gas flows;
(b) means to supply air to the exhaust apparatus; and
(c) engine management means;
the exhaust apparatus containing:
(d) an electrical heater;
(e) a CO and $H_2$ oxidation catalyst for oxidising CO and $H_2$ in the exhaust gas, the CO and $H_2$ oxidation catalyst being positioned on or downstream of the electrical heater; and
(f) a hydrocarbon oxidation catalyst for oxidising hydrocarbon in the exhaust gas, the hydrocarbon oxidation catalyst being also the CO and $H_2$ oxidation catalyst or being positioned downstream thereof;
the engine being adapted so that on starting it at ambient temperature, the engine management means is effective to produce heat electrically by the electrical heater, and so that on or after the start of engine and extending into a time at least 5 seconds after the start of the engine, the engine management means is effective to decrease the air/fuel ratio to the engine so as to increase the amount of CO and $H_2$ supplied to the CO and $H_2$ oxidation catalyst and to supply sufficient air to the CO and $H_2$ oxidation catalyst by the means to supply air so as to increase the amount of CO and $H_2$ oxidised by the CO and $H_2$ oxidation catalyst and hence increase the heat produced chemically by the CO and $H_2$ oxidation catalyst, whereby the heat produced electrically by the electrical heater and the increase in heat produced chemically by the CO and $H_2$ oxidation catalyst heat the CO and $H_2$ oxidation catalyst to speed up its reaching the hydrocarbon light-off temperature of the hydrocarbon oxidation catalyst and hence speed up the hydrocarbon oxidation catalyst reaching its light-off temperature.

The invention provides also a method of converting CO, $H_2$ and hydrocarbon in the exhaust gas of an engine to $CO_2$ and water in order to combat air pollution, by contacting the gas with a CO and $H_2$ oxidation catalyst and simultaneously or subsequently with a hydrocarbon oxidation catalyst, which method is conducted so that on starting the engine at ambient temperature an electrical heater produces heat electrically and on or after the start of the engine and extending into a time at least 5 seconds after the start of the engine, the air/fuel ratio of the engine is decreased and air is supplied so as to increase the amount of CO and $H_2$ supplied to the CO and $H_2$ oxidation catalyst and to supply sufficient air to the CO and $H_2$ oxidation catalyst so as to increase the amount of CO and $H_2$ oxidised by the CO and $H_2$ oxidation catalyst and hence increase the heat produced chemically by the CO and $H_2$ oxidation catalyst, whereby the heat produced electrically by the electrical heater and the increase in heat produced chemically by the CO and $H_2$ oxidation catalyst heat the CO and $H_2$ oxidation catalyst to speed up its reaching the hydrocarbon light-off temperature of the hydrocarbon oxidation catalyst and hence speed up the hydrocarbon catalyst reaching its light-off temperature.

BRIEF DESCRIPTION OF THE DRAWING

The FIGURE is a block diagram illustrating a preferred embodiment of the present invention.

DETAILED DESCRIPTION OF THE DRAWING

It can be seen that the present invention involves the combination of electrical heating and enhancement of heat from the exothermic oxidation of CO and $H_2$ over the oxidation catalyst. The present invention provides surprisingly good combatting of hydrocarbon (HC) in the cold-start phase. It has been proposed—see WO 9508702—to employ a combination of electrical heating with an up-stream HC trap. We have found, however, that its power requirements for the electrical heating in order to achieve fast light-off of the HC oxidation catalyst can be very high, especially since the electrical heater, being downstream from a HC trap, receives virtually no sensible heat from the engine at cold start. In the present invention, less electrical power is required because besides the heat produced electrically by the electrical heater there is the increase in heat produced chemically by the CO and $H_2$ oxidation catalyst through the oxidation reactions of CO and $H_2$. Accordingly, in the present invention one can achieve lower HC emissions for the same electrical power input or the same HC emissions for a lower electrical power input.

In the present invention, the engine is adapted so that on starting it at ambient temperature the engine management means is effective to produce heat electrically by the electrical heater. The engine is adapted also so that on or after the start of the engine and extending into a time at least 5 seconds after the start of the engine, the engine management means is effective to decrease the air/fuel ratio to the engine and to supply sufficient air to the CO and $H_2$ oxidation catalyst by the means to supply air. In this way, the amount of CO and $H_2$ supplied to the CO and $H_2$ oxidation catalyst is increased and the amount of CO and $H_2$ oxidised by the catalyst is increased. Hence, the heat produced chemically by the CO and $H_2$ oxidation catalyst through the oxidation reactions of CO and $H_2$ is increased. The heat produced electrically by the electrical heater and the increase in heat produced chemically by the CO and $H_2$ oxidation catalyst heat the CO and $H_2$ oxidation catalyst to speed up its reaching the HC light-off temperature of the HC oxidation catalyst and hence speed up the HC oxidation catalyst reaching its light-off temperature. The heat from the electrical heater can speed the CO and $H_2$ oxidation catalyst to its light-off temperature for CO or $H_2$ and then the increase in heat produced chemically by the catalyst by supplying sufficient oxygen to it and increasing the amount of CO and $H_2$ supplied to it can speed it to the light-off temperature of the HC oxidation catalyst.

The present invention is defined in terms of what happens on starting the engine at ambient temperature, defined for these purposes as 25° C. It will be appreciated that normally such an engine would also satisfy the definition on starting it at temperatures other than 25° C., for instance at −10° C. or when ambient air temperature is 25° C. but the engine's temperature is below this through not having warmed up after a night cooler than this.

On starting the present engine, the engine management system is effective to produce heat electrically by the electrical heater. The heater can have been started before the engine, e.g. a few seconds before the engine, for instance to heat the system to some extent, or the heater can be started on starting the engine. The CO and $H_2$ oxidation catalyst can be positioned downstream of the electrical heater, particularly immediately downstream so as to benefit quickly from the heat produced electrically by the electrical heater. Advantageously, however, the CO and $H_2$ oxidation catalyst is positioned on the electrical heater, to optimise receipt of heat by the catalyst from the heater and to provide a more convenient and more compact arrangement. The electrical heater, carrying or not carrying the CO and $H_2$ oxidation catalyst, can be as known. Reference is made for instance to U.S. Pat. Nos. 4,976,929 and 5,411,711, the contents of which are incorporated herein by reference.

The electrical heater can be an electrically heatable catalytic converter unit, preferably one formed of a thin metal honeycomb monolith. The monolith can be formed of spaced flat thin metal strips, straight through corrugated thin metal strips, pattern corrugated thin metal strips, e.g. herringbone or chevron corrugated thin metal strips, or variable pitch corrugated thin metal strips, or a combination thereof. In a particular embodiment, the monolith is formed of a plurality of spirally wound corrugated thin metal strips, for instance of length such that each conductive length (from centre to periphery for example) has a resistance at 70° F. (21° C.) of 0.05 to 5 ohms. The thin metal honeycomb monolith can have for instance 50 to 700, e.g. 100, cells per square inch (6.45 square cm). The thin metal can have a thickness for instance of 0.001 to 0.005 inch (0.0025 to 0.0127 cm).

The electrical heater is connected to an appropriate energy source, for instance a 12–108 volt, AC or DC, supply. The energy can be supplied by an alternator, either directly or through a rectifier system, or by a battery or an energy storage capacitor device. The supply can be for instance a 12 volt or 24 volt battery. The power of the electrical heater can be for instance 500 to 10,000 watts.

On or after the start of the engine, the engine management means is effective to decrease the air/fuel ratio (AFR) to the engine and to supply sufficient air to the CO and $H_2$ oxidation catalyst; in this way, the heat produced chemically by the CO and $H_2$ oxidation catalyst is increased. This AFR decrease and air supply extends into a time at least 5 seconds after the start of the engine. Hence, at a time at least 5 seconds after the start of the engine, this AFR decrease and air supply is occurring; it may have started on starting the engine, within the first 5 seconds after starting the engine or after the first 5 seconds after starting the engine. Accordingly, the present system differs from merely decreasing the air/fuel ratio to facilitate cranking the engine. The present AFR decrease and air supply is not required after the CO and $H_2$ oxidation catalyst and the HC oxidation catalyst are operating at a steady state. Usually the decrease and supply is halted within 180 seconds, preferably within 20 seconds, after starting the engine.

The means to supply air to the exhaust apparatus can be as known. An air pump and associated piping to the exhaust apparatus is generally employed. The air is usually supplied upstream of the CO and $H_2$ oxidation catalyst.

The supply of air is preferably sufficient so that substantially all the CO and $H_2$ in the gas is reacted by the CO and $H_2$ oxidation catalyst. In this way, any CO which might otherwise pollute or have to be converted is dealt with while maximising the contribution of the CO and $H_2$ to the increase in heat produced by the catalyst.

In one embodiment, the CO and $H_2$ oxidation catalyst is of light-off temperature for CO and/or $H_2$ above ambient temperature under operating conditions and the management means being effective to decrease the air/fuel ratio and supply air occurs when the CO and $H_2$ oxidation catalyst reaches its light-off temperature. In this way, the electrical heater (together with any other heat, in particular sensible heat from the engine) heats the catalyst to its light-off temperature for CO or $H_2$ and then the air/fuel ratio is decreased so that the reaction which has lit off is then enhanced to increase the amount of heat it produces.

The CO and $H_2$ oxidation catalyst and the HC oxidation catalyst are preferably low light-off temperature catalysts. The CO and $H_2$ oxidation catalyst is preferably of light-off temperature for CO and $H_2$ below 100° C. under operating conditions.

Especially preferred is the CO and $H_2$ oxidation catalyst being of light-off temperature for CO and/or $H_2$ not above ambient temperature under operating conditions. In that case, reaction over the catalyst occurs on starting the engine at ambient temperature, and preferably the management means being effective to decrease the air/fuel ratio and supply air occurs on starting the engine at ambient temperature so that enhancement of heat generation by the catalyst occurs on starting the engine.

When the CO and $H_2$ oxidation catalyst is of light-off temperature for CO and/or $H_2$ not above ambient temperature under operating conditions, it is preferred that the supply of air and the increase in the amount of CO and $H_2$ is sufficient so that the CO and $H_2$ oxidation catalyst alone produces enough heat to raise its temperature from ambient temperature to the HC light-off temperature of the HC oxidation catalyst. Reference for this feature is made to our patent specification WO 96/39576, the contents of which are incorporated herein by reference. This feature means that engine heat is a bonus. Because engine heat is not necessary in order for the HC oxidation catalyst to reach its light-off temperature, it need not be close to the engine; because the CO and $H_2$ oxidation catalyst lights off not above ambient temperature, it need not be close to the engine. Accordingly, either or both catalysts can be positioned further from the engine. This means that the catalyst can suffer less from thermal degradation and need not be accommodated in restricted space close to the engine but can be accommodated under a vehicle floor. A further advantage which flows from the ability to site the CO and $H_2$ oxidation catalyst or the HC oxidation catalyst further from the engine is that in such a position the catalyst is less affected by the heat carried in the exhaust gas from the engine and hence a temperature measuring device, usually a thermocouple, in the catalyst more closely indicates the extent to which the oxidation of the CO or HC is occurring because the device is less influenced by this engine heat. Such a device can be used as an on-board diagnostic means, so that the performance of the catalyst can be measured and monitored.

The amount of hydrogen in the exhaust gas of engines is usually small relative to the amount of CO. Where reference is made herein therefore to the light-off temperature for CO and/or $H_2$, the light-off temperature for CO is usually of much greater significance. Accordingly, it is preferred that the CO and $H_2$ oxidation catalyst be chosen with regard to its CO light-off temperature, and it is preferred that the CO and $H_2$ oxidation catalyst be of light-off temperature for CO not above ambient temperature under operating conditions.

The present engine management means can be of known type. Its functions can be regulated for instance by suitable arrangement of the memory and/or control circuitry on an engine management "chip". In the present phase to HC light-off, the amount of CO and $H_2$ supplied to the CO and $H_2$ oxidation catalyst is increased over their general level during operation of the engine. Their amounts can be reduced after light-off of the HC oxidation catalyst. This can be done by setting a time interval for the increase. Alternatively, a feedback mechanism from a temperature measuring device measuring the exhaust gas temperature, for instance at the HC oxidation catalyst, can be employed.

The increase in the amount of CO and $H_2$ supplied to the CO and $H_2$ oxidation catalyst depends on the rise in temperature needed by the exothermic reaction to reach the light-off temperature of the HC oxidation catalyst. In general, the higher that temperature, the higher the amount of CO and/or $H_2$ needed. Preferably, the CO content of the exhaust gas is increased to more than 0.5%, preferably more than 2%, especially more than 4%, by volume; usually it contains less than 10% CO by volume. Providing more CO in the exhaust gas contacting the CO and $H_2$ oxidation catalyst is contrary to the direction in which engine manufacturers have been developing engines in the past.

The present HC oxidation catalyst can be positioned downstream of the CO and $H_2$ oxidation catalyst. Advantageously, however, the HC oxidation catalyst is also the CO and $H_2$ oxidation catalyst; in that case, the exhaust gas contacts them simultaneously. This can be done by employing a material which is catalytically active for the oxidation of CO and $H_2$ on the one hand and HC on the other hand. Alternatively, it can be done by employing a mixture of a material which is catalytically active for the oxidation of CO and $H_2$ with a different material, which is catalytically active for the oxidation of HC. When the HC oxidation catalyst is positioned downstream of the CO and $H_2$ oxidation catalyst, the exhaust gas contacts the HC oxidation catalyst subsequent to contact with the CO and $H_2$ oxidation catalyst. This can be achieved for instance by having the CO and $H_2$ oxidation catalyst on the front part of a honeycomb monolith and the HC oxidation catalyst on the rear part of the monolith.

The heat produced electrically by the electrical heater and the increase in heat produced chemically by the CO and $H_2$ oxidation catalyst heat the CO and $H_2$ oxidation catalyst to speed up (with any engine heat) its reaching the HC light-off temperature of the HC oxidation catalyst. When the CO and $H_2$ oxidation catalyst is the HC oxidation catalyst, the latter is then automatically at the light-off temperature of the HC oxidation catalyst. When the CO and $H_2$ oxidation catalyst is not the HC oxidation catalyst, so that the exhaust gas contacts the HC oxidation catalyst after contacting the CO and $H_2$ oxidation catalyst, then heat from the CO and $H_2$ oxidation catalyst is used to heat the HC oxidation catalyst, usually by the exhaust gas carrying heat from the CO and $H_2$ oxidation catalyst to the HC oxidation catalyst.

The CO and $H_2$ oxidation catalyst is preferably of light-off temperature for CO and/or $H_2$ not above ambient temperature under operating conditions, in an engine exhaust apparatus. This is a demanding environment because of such features as high temperatures, physical shocks, high gas flow, and inhibitors in the exhaust gas. Some CO and $H_2$ oxidation catalysts may be of light-off temperature for CO and/or $H_2$ not above ambient temperature when in a more tolerant environment but not in the present situation. In the present invention, the exhaust gas contacting the CO and $H_2$ oxidation catalyst may contain for instance up to 20% by volume water. It may contain for instance 1–20% by volume $CO_2$. It may contain for instance 100–4,000 ppm NO. It may contain for instance 100–10,000 ppm hydrocarbon. It may contain for instance 0.2–20 ppm $SO_2$. In this specification, ppm means parts per million by volume.

Preferably the CO and $H_2$ oxidation catalyst is of positive order kinetics with respect to CO in its oxidation reaction. This contrasts with typical catalysts for exhaust systems, which are of negative or zero order. For a catalyst with negative order kinetics with respect to CO, increasing the CO concentration would decrease the rate of CO oxidation at temperatures below the light-off temperature. For a catalyst with zero order kinetics with respect to CO, increasing the CO concentration would leave unchanged the rate of CO oxidation at temperatures below the light-off temperature. The consequence of negative or zero order kinetics is that additional CO would not cause a larger exotherm over the CO and $H_2$ oxidation catalyst until after the catalyst has lit off, so that at temperatures below light-off temperature, higher CO levels would not cause an increase in the reaction rate or heat generated. However, for a catalyst with positive order kinetics with respect to CO, an increase in CO concentration would lead to an increase in reaction rate, and thus in heat generation. Hence such a catalyst is advantageous in the present invention.

Materials suitable for use as the present CO and $H_2$ oxidation catalyst or HC oxidation catalyst can be selected from known catalysts.

The CO and $H_2$ oxidation catalyst preferably contains one, two or all of platinum, palladium and rhodium. The HC oxidation catalyst preferably contains one, two or all of platinum, palladium and rhodium, especially both platinum and palladium. Platinum is excellent for the oxidation of olefins, and palladium for the oxidation of aromatic hydrocarbons.

So as to be able to treat also nitrogen oxides in the engine exhaust gas, the exhaust apparatus usually contains also a catalyst to reduce nitrogen oxides in the gas to nitrogen. The catalytically active material for this usually comprises rhodium. Conveniently, a three-way catalyst is employed, which treats the CO, hydrocarbon and nitrogen oxides. Advantageously, the present CO and $H_2$ oxidation catalyst is a three-way catalyst.

In a preferred embodiment, the exhaust apparatus contains at least one (usually one or two) additional, three-way, catalyst, to convert CO in the exhaust gas to $CO_2$ by reaction with oxygen, HC in the exhaust gas to $CO_2$ and water by reaction with oxygen, and nitrogen oxides in the exhaust gas to nitrogen. In this way, the present CO and $H_2$ oxidation catalyst and HC oxidation catalyst can be used for the cold start, and the additional, three-way, catalyst or catalysts can be used as the main catalyst.

Any of the catalysts discussed above in relation to the present invention can be formulated in the usual way. Usually the catalyst comprises catalytically active material, especially one or both of platinum and palladium, optionally together with rhodium, on a support which is generally a refractory metal oxide, for instance alumina. The support should preferably be of high surface area, e.g. greater than 20 $m^2/g$. The catalytically active material, optionally on a support, is preferably carried on a carrier, for instance by being carried on a gauze but preferably by being carried in the channels of a honeycomb monolith through which the exhaust gas flows. The monolith can be metal or ceramic. When the CO and $H_2$ oxidation catalyst is positioned on the electrical heater, the electrical heater can comprise the monolith. Thus, for instance a metal monolith to serve as electrical heater can be coated with a support and then with catalytically active material.

In a preferred embodiment, the exhaust apparatus contains also a hydrocarbon trap which traps HC in the exhaust gas at lower temperatures and releases it at higher temperatures to contact the HC oxidation catalyst, preferably to contact also the CO and $H_2$ oxidation catalyst. In this way, HC can be stored while the exothermic reaction on the CO and $H_2$ oxidation catalyst heats up the HC oxidation catalyst, and then HC released when the HC oxidation catalyst can better treat the HC. The HC trap is preferably upstream of the HC oxidation catalyst, and preferably upstream of the CO and $H_2$ oxidation catalyst. The trap can be for instance upstream of the electrical heater. Alternatively, HC trap and catalyst can be admixed or the trap can be a layer above or below a layer of catalyst. Hydrocarbon trap materials are known in themselves. Usually, the HC trap comprises a zeolite. A suitable zeolite is an ion-exchanged zeolite, such as Co/ZSM-5 or Pt/ZSM-5, but other materials, including impregnated zeolites and non-metallised zeolites, may be used. Preferred HC trap materials are those which have a trapping effect also on nitrogen oxides (particularly NO), so that they too are trapped at lower temperatures and released at higher temperatures. The HC trap can comprise the material known as silicalite as a cost-effective HC trap material.

We have found that it can be advantageous to sweep gas, usually air, preferably heated air, over the CO and $H_2$ oxidation catalyst before starting the engine, to reduce the amount of gas which has been adsorbed on the catalyst. Such adsorbed gas may be $H_2O$ (water vapour), $CO_2$, NO or hydrocarbon. Hence, in a preferred embodiment, the exhaust apparatus contains means to thus sweep gas over the catalyst. After such pre-treatment, the catalyst can have enhanced catalytic activity for CO and $H_2$ conversion on starting the engine at ambient temperature. The catalyst is preferably in the state that results from this sweep, whether it has been achieved in this way or otherwise. In a preferred embodiment, the heat produced by the present electrical heater removes moisture from the CO and $H_2$ oxidation catalyst and prevents adsorption of water on it, hence combatting the inhibiting effect of water and lowering the CO and/or $H_2$ light-off temperature of the catalyst.

The exhaust apparatus preferably contains means to dry, or keep dry, the CO and $H_2$ oxidation catalyst before the exhaust gas contacts it. The means can be operative after switching off the engine or preferably before starting the engine. The HC oxidation catalyst and, if employed, the HC trap are preferably likewise pre-dried or kept dry. The means to keep the CO and $H_2$ oxidation catalyst dry can be for instance a device to prevent the back-diffusion of air from the outside into the exhaust pipe; the device can be a shut-off valve or a desiccant water trap. The pre-drying can be done by the sweep of gas discussed above. Reference can be made to our European patent specification 0 747581 A, the contents of which are incorporated herein by reference.

The means to sweep gas or to pre-dry can comprise for instance a pump to provide a stream of gas, usually air, over the catalyst, preferably after switching off the engine. The air is preferably heated air, e.g. air at 350–500° C. Advantageously, residual engine heat, for instance that transferred to the exhaust apparatus, is used so that the air employed is heated. The means to sweep gas or to pre-dry can comprise the present means (B) to supply air to the exhaust apparatus.

The exhaust apparatus can contain also a water trap to trap water on starting the engine at ambient temperature before the water can contact the CO and $H_2$ oxidation catalyst. The presence of water can adversely affect the operation of the CO and $H_2$ oxidation catalyst and of any HC trap. The water trap is preferably up-stream of the CO and $H_2$ oxidation catalyst, and preferably up-stream of the HC trap if such is employed. Alternatively, the water trap can be admixed with the CO and $H_2$ oxidation catalyst and/or the HC trap, or a layered arrangement can be employed. The water trap preferably comprises a water trapping molecular sieve, such as zeolite 5A, although zeolite 3A, 4A, 13X or USY may be used. Most zeolites preferentially absorb water in comparison with their adsorption of HC, but in general the smaller pore size zeolites are preferred. The water trap and the HC trap may also comprise the same material.

In a preferred embodiment, the exhaust apparatus contains in sequence proceeding downstream from the engine, a three-way catalyst, an inlet for a supply of air from the means to supply air, a water trap, a hydrocarbon trap, an electrical heater bearing a CO and $H_2$ and hydrocarbon oxidation catalyst, and then at least one (usually one or two) additional CO and $H_2$ and hydrocarbon oxidation catalyst.

In a particular embodiment, the water trap is dried by the means to dry discussed above. In this embodiment, the means to dry can incorporate a secondary water trap to dry gas, usually air, from a gas pump for the purpose of drying the main water trap. The secondary water trap can be dried or regenerated during engine operation by utilising waste heat, for instance from the engine, e.g. with a relatively low flow of gas from the pump.

In the past, a CO and $H_2$ oxidation catalyst has been positioned, in the so-called close-coupled position, close the engine, generally 20–30 cm from the outlet of an engine manifold, as measured by gas flow length. This is because engine heat has been necessary to light-off the catalyst. In the present invention, particularly when the CO and $H_2$ oxidation catalyst is of light-off temperature for CO and/or $H_2$ not above ambient temperature under operating conditions, such engine heat is not necessary. Accordingly, the CO and $H_2$ oxidation catalyst can be positioned anywhere in the exhaust system rather than having to be in a closed-coupled position. This is a great advantage. It means that the catalyst need not be in the very restricted space for the engine in a vehicle; instead, the catalyst can be under the vehicle floor. The catalyst is preferably at least 50 cm, for instance at least 1 meter, but usually less than 10 meters, generally less than 4 meters, as measured by gas flow length, from the exit of the exhaust gas from the engine, for instance from the outlet of an engine manifold. Because it can be remote from the heat generated by the engine, the catalyst need not be so thermally durable. Preferably, the maximum temperature to which the present catalyst is subjected in the invention is less than 950° C., preferably less than 850° C., especially less than 700° C. By-pass apparatus can be present around the present apparatus so that it does not encounter exhaust gas throughout engine operation after light-off of the HC oxidation catalyst, but any valves operating such apparatus can be subject to lower temperatures by being more remote from the engine. The means (b) to supply air to the exhaust apparatus similarly need not be in the engine space but can be more remote. A further benefit of the CO and $H_2$ oxidation catalyst being remote is that possible problems of it interfering with the performance of an additional main, three-way, catalyst can be avoided. Indeed, in an interesting embodiment of the present invention the present CO and $H_2$ oxidation catalyst is downstream of a three-way catalyst.

Similarly, other devices whose position depends on the CO and $H_2$ oxidation catalyst, such as the HC oxidation catalyst, a HC trap, a water trap, means to sweep gas or means to dry the CO and $H_2$ oxidation catalyst as discussed above, can all be remote from the engine and hence subject to lower temperatures. The lower temperatures may enable the water trap to trap water longer and the HC trap to trap HC longer.

The present invention may be applied to engines in general whose exhaust gas contains CO, $H_2$ and HC. It is applicable to lean burn engines, for instance diesel engines.

Preferably the engine is a petrol (gasoline) engine. The engine is preferably that of a vehicle.

The present method, and engine and associated apparatus, are remarkably effective in converting HC in the cold start-up period. Usually they lower the total amount of HC emitted from the exhaust apparatus in the first 50 seconds after starting the engine at ambient temperature by a factor of at least 3, preferably by a factor of at least 6, compared to the amount emitted by the same engine without the present features. Usually the total amount of HC emitted in the first 100 seconds after starting the engine at ambient temperature is less than 0.1 g, preferably less than 0.04 g, especially less than 0.008 g.

The present invention is illustrated by the accompanying drawing, whose sole FIGURE is a block diagram illustrating a preferred embodiment. The FIGURE shows an engine operating in a rich start-up condition, ie at a decreased air/fuel ratio to the engine. The exhaust gas flows to a three-way catalyst (TWC), and thence, after being joined by a supply of air from an air pump, to a water trap, then a hydrocarbon (HC) trap, and then an electrical heater bearing a CO and $H_2$ and HC oxidation catalyst, and then an additional CO and $H_2$ and HC oxidation catalyst.

The invention is illustrated also by the following Example.

EXAMPLE

The engine of a medium size vehicle produces typically a flow of exhaust gas of 500 standard liters per minute at start-up. One can calculate the power that would be generated by the complete oxidation of CO in this gas as a function of the concentration of the CO. The results are shown in the following Table.

| % CO | Power, kW |
| --- | --- |
| 1 | 1 |
| 2 | 2 |
| 3 | 3 |
| 4 | 4 |
| 5 | 5 |

In other words, at typical flow rates encountered in real use, 1 kW of power is generated per each percentage point of CO concentration in the exhaust gas. 5 kW would be considered quite a large amount of power for an electrical heater. This illustrates the saving in power for the electrical heater which can be obtained by utilising the present invention's combination of such a heater with the increase in heat produced chemically by the CO and $H_2$ oxidation catalyst.

What is claimed is:

1. An engine producing exhaust gas containing CO, $H_2$ and hydrocarbon, the engine having:

(a) exhaust apparatus through which the exhaust flows;
 (b) means to supply air to the exhaust apparatus; and
 (c) engine management means;

the exhaust apparatus containing:

(a) an electrical heater;
 (b) a CO and $H_2$ oxidation catalyst for oxidising CO and $H_2$ in the exhaust gas, the CO and $H_2$ oxidation catalyst being positioned on or downstream of the electrical heater;
 (c) a hydrocarbon oxidation catalyst for oxidising hydrocarbon in the exhaust gas, the hydrocarbon oxidation catalyst being also the CO and $H_2$ oxidation catalyst or being positioned downstream thereof;

(d) an inlet from the means to supply air, the inlet positioned upstream of the CO and $H_2$ oxidation catalyst and the hydrocarbon oxidation catalyst; and (e) a three-way catalyst for oxidising CO and HC to form $CO_2$ and $H_2O$ and for reducing $NO_x$ to form nitrogen, said three-way catalyst positioned upstream of the inlet, wherein all of said air supplied to the exhaust apparatus is introduced to the exhaust apparatus at a point downstream of said three-way catalyst;

the engine being adapted so that on starting it at ambient temperature, the engine management means is effective to produce heat electrically by the electrical heater, and so that on or after the start of the engine and extending into a time at least 5 seconds after the start of the engine, the engine management means is effective to decrease the air/fuel ratio to the engine so as to increase the amount of CO and $H_2$ supplied to the CO and $H_2$ oxidation catalyst and to supply sufficient air to the CO and $H_2$ oxidation catalyst by the means to supply air so as to increase the amount of CO and $H_2$ oxidised by the CO and $H_2$ oxidation catalyst and hence increase the heat produced chemically by the CO and $H_2$ oxidation catalyst, whereby the heat produced electrically by the electrical heater and the increase in heat produced chemically by the CO and $H_2$ oxidation catalyst heat the CO and $H_2$ oxidation catalyst to speed up its reaching the hydrocarbon light-off temperature of the hydrocarbon oxidation catalyst and hence speed up the hydrocarbon oxidation catalyst reaching its light-off temperature.

2. An engine according to claim 1, wherein the supply of air is sufficient so that substantially all the CO and $H_2$ in the gas is reacted by the CO and $H_2$ oxidation catalyst.

3. An engine according to claim 2, wherein the CO and $H_2$ oxidation catalyst is of light-off temperature for CO and/or $H_2$ above ambient temperature under operating conditions and the management means being effective to decrease the air/fuel ration and supply air occurs when the CO and $H_2$ oxidation catalyst reaches its light-off temperature.

4. An engine according to claim 2, wherein the CO and $H_2$ oxidation catalyst is of light-off temperature for CO and/or $H_2$ not above ambient temperature under operating conditions.

5. An engine according to claim 2, wherein the heat produced by the electrical heater removes moisture from the CO and $H_2$ oxidation catalyst and prevents adsorption of water on it, hence combatting the inhibiting effect of water and lowering the CO and/or $H_2$ light-off temperature of the catalyst.

6. An engine according to claim 2, whose exhaust apparatus contains also, upstream of the electrical heater, a hydrocarbon trap which traps hydrocarbon in the exhaust gas at lower temperatures and releases it at higher temperatures.

7. An engine according to any claim 2, wherein the CO and $H_2$ oxidation catalyst is positive order kinetics with regard to CO in its oxidation reaction.

8. An engine according to claim 2, wherein the CO and $H_2$ oxidation catalyst comprises a catalytic element selected from the group consisting of at least one of Pt, Pd and Rh.

9. An engine according to claim 2, wherein the hydrocarbon oxidation catalyst comprises a catalytic element selected from the group consisting of at least one of Pt, Pd and Rh.

10. An engine according to claim 2, wherein the hydrocarbon oxidation catalyst is also the CO and $H_2$ oxidation catalyst.

11. An engine according to claim 2, wherein the CO and $H_2$ oxidation catalyst is positioned on the electric heater.

12. An engine according to claim 2, which is that of a vehicle.

13. An engine according to claim 1, wherein the CO and $H_2$ oxidation catalyst is of light-off temperature for CO and/or $H_2$ above ambient temperature under operating conditions and the management means being effective to decrease the air/fuel ration and supply air occurs when the CO and $H_2$ oxidation catalyst reaches its light-off temperature.

14. An engine according to claim 1, wherein the CO and $H_2$ oxidation catalyst is of light-off temperature for CO and/or $H_2$ not above ambient temperature under operating conditions.

15. An engine according to claim 14, wherein the management means being effective to decrease the air/fuel ratio and supply air occurs on starting the engine.

16. An engine according to claim 14, wherein the supply of air and the increase in the amount of CO and $H_2$ is sufficient so that the CO and $H_2$ oxidation catalyst alone produces enough heat to raise its temperature from ambient temperature to the hydrocarbon light-off temperature of the hydrocarbon oxidation catalyst.

17. An engine according to claim 1, wherein the heat produced by the electrical heater removes moisture from the CO and $H_2$ oxidation catalyst and prevents adsorption of water on it, hence combatting the inhibiting effect of water and lowering the CO and/or $H_2$ light-off temperature of the catalyst.

18. An engine according to claim 1, whose exhaust apparatus contains also, upstream of the electrical heater, a hydrocarbon trap which traps hydrocarbon in the exhaust gas at lower temperatures and releases it at higher temperatures.

19. An engine according to claim 18 wherein the hydrocarbon trap contains zeolite.

20. An engine according to claim 1, wherein the CO and $H_2$ oxidation catalyst is positive order kinetics with regard to CO in its oxidation reaction.

21. An engine according to claim 1, wherein the CO and $H_2$ oxidation catalyst comprises a catalytic element selected from the group consisting of at least one of Pt, Pd and Rh.

22. An engine according to claim 1, wherein the hydrocarbon oxidation catalyst comprises a catalytic element selected from the group consisting of at least one of Pt, Pd and Rh.

23. An engine according to claim 1, wherein the hydrocarbon oxidation catalyst is also the CO and $H_2$ oxidation catalyst.

24. An engine according to claim 1, wherein the CO and $H_2$ oxidation catalyst is positioned on the electric heater.

25. An engine according to claim 1, which is that of a vehicle.

26. An engine according to claim 1 wherein the three-way catalyst comprises more than one catalytically active component.

27. A method of converting CO, $H_2$ and hydrocarbon in the exhaust gas of an engine to $CO_2$ and water in order to combat air pollution, by contacting the gas with a three-way catalyst for oxidising CO and HC to form $CO_2$ and $H_2O$ and for reducing $NO_x$ to form nitrogen and then with a CO and $H_2$ oxidation catalyst and simultaneously or subsequently with a hydrocarbon oxidation catalyst, which method is conducted so that on starting the engine at ambient temperature an electrical heater produces heat electrically and on or after the start of the engine and extending into a time at least 5 seconds after the start of the engine, the air/fuel ratio of the engine is decreased and air is supplied subsequent to contacting the gas with the three-way catalyst so as to increase the amount of CO and $H_2$ supplied to the CO and $H_2$ oxidation catalyst, wherein all of said air supplied is introduced to the gas subsequent to contacting the gas with said three-way catalyst and to supply sufficient air to the CO and $H_2$ oxidation catalyst so as to increase the amount of CO and $H_2$ oxidised by the CO and $H_2$ oxidation catalyst and hence increase the heat produced chemically by the CO and $H_2$ oxidation catalyst, whereby the heat produced electrically by the electrical heater and the increase in heat produced chemically by the CO and $H_2$ oxidation catalyst heat the CO and $H_2$ oxidation catalyst to speed up its reaching the hydrocarbon light-off temperature of the hydrocarbon oxidation catalyst and hence speed up the hydrocarbon oxidation catalyst reaching its light-off temperature.

28. An engine producing exhaust gas containing CO, $H_2$ and hydrocarbon, the engine having:
(a) exhaust apparatus through which the exhaust flows;
(b) means to supply air to the exhaust apparatus; and
(c) engine management means;
the exhaust apparatus containing:
(a) a three-way catalyst for oxidising CO and HC to form $CO_2$ and $H_2O$ and for reducing $NO_x$ to form nitrogen, wherein all of said air supplied to the exhaust apparatus is introduced to the exhaust apparatus at a point downstream of said three-way catalyst;
(b) an inlet from the means to supply air, positioned downstream of the three-way catalyst;
(c) an electrical heater and a CO and $H_2$ oxidation catalyst positioned downstream of the inlet for oxidising CO and $H_2$ in the exhaust gas, the CO and $H_2$ oxidation catalyst being positioned on or downstream of the electrical heater; and
(d) a hydrocarbon oxidation catalyst for oxidising hydrocarbon in the exhaust gas, the hydrocarbon oxidation catalyst being also the CO and $H_2$ oxidation catalyst or being positioned downstream thereof;
the engine being adapted so that on starting it at ambient temperature, the engine management means is effective to produce heat electrically by the electrical heater, and so that on or after the start of the engine and extending into a time at least 5 seconds after the start of the engine, the engine management means is effective to decrease the air/fuel ratio to the engine so as to increase the amount of CO and $H_2$ supplied to the CO and $H_2$ oxidation catalyst and to supply sufficient air to the CO and $H_2$ oxidation catalyst by the means to supply air so as to increase the amount of CO and $H_2$ oxidised by the CO and $H_2$ oxidation catalyst and hence increase the heat produced chemically by the CO and $H_2$ oxidation catalyst, whereby the heat produced electrically by the electrical heater and the increase in heat produced chemically by the CO and $H_2$ oxidation catalyst heat the CO and $H_2$ oxidation catalyst to speed up its reaching the hydrocarbon light-off temperature of the hydrocarbon oxidation catalyst and hence speed up the hydrocarbon oxidation catalyst reaching its light-off temperature.

29. The engine of claim 28, wherein the exhaust apparatus further comprises an $H_2O$ absorbing trap and an HC absorbing trap, wherein the $H_2O$ absorbing trap and the HC absorbing trap are positioned downstream from the inlet and upstream of the electrical heater and the CO and $H_2$ oxidation catalyst.

* * * * *